Oct. 17, 1933.   C. B. ADAMS   1,930,989

SCHEDULE INDICATOR

Filed May 8, 1928

WITNESS

INVENTOR
C. B. Adams,
BY
ATTORNEY

Patented Oct. 17, 1933

1,930,989

UNITED STATES PATENT OFFICE 1,930,989

SCHEDULE INDICATOR

Cornele Berrien Adams, Bayamon, Puerto Rico

Application May 8, 1928. Serial No. 276,135

2 Claims. (Cl. 235—103.5)

The object of my invention is to provide an instrument in which progress in space may be so synchronized with progress in time that a set schedule of progression may be maintained and any departure therefrom instantly indicated and the amount of time lost, or gained, exactly measured. It is especially applicable to public vehicles such as electric cars, trains or bus lines. It enables the drivers to know at every point along their route if they are passing such point on schedule time or if they are ahead or behind and how much. In this way a line of buses or cars can maintain their proper headway. This cannot be done by the ordinary speedometer because it indicates velocity only and not progression; nor by an odometer because it registers progression only, and not speed.

Figure 1:
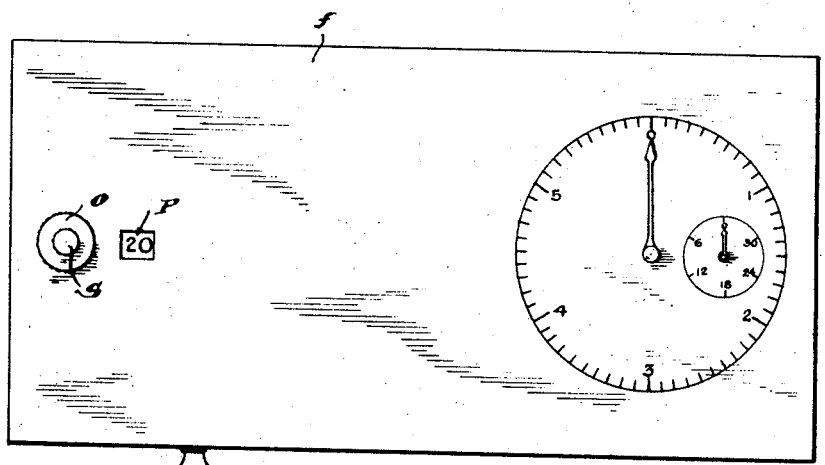

In the drawing, Figure 1 shows a front elevation of the instrument, as it appears to the observer when in use. The two dial hands on the right are the indicators, the smaller dial registering the time beyond one revolution of the larger one, but registering directly in minutes and not in revolutions of the larger hand. The number on the left, appearing through a slot in the face plate of the instrument, indicates the speed for which the instrument is set. This speed may be varied by turning the thumb screw on the left of the slot, as hereinafter more fully explained.

When the dial hands point at zero it indicates that the vehicle is on time and progressing at the set speed, which in the figure is 20 miles per hour.

Should a stop, for passengers or other cause, be made, the large dial hand will move to the right and register, perhaps, a fraction of a minute. The driver upon starting up again will speed up beyond the set speed until the dial hand moves back to zero, and he will have recovered his schedule.

Figure 2:
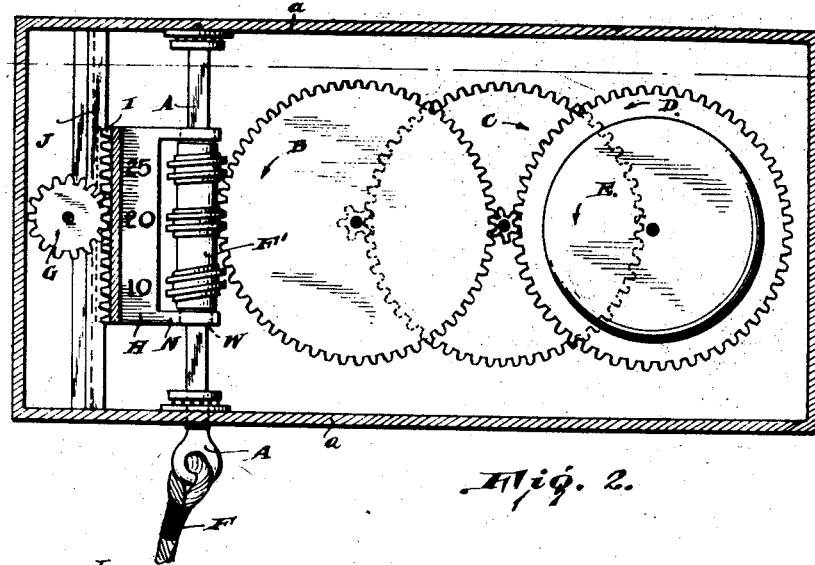
Figure 3:
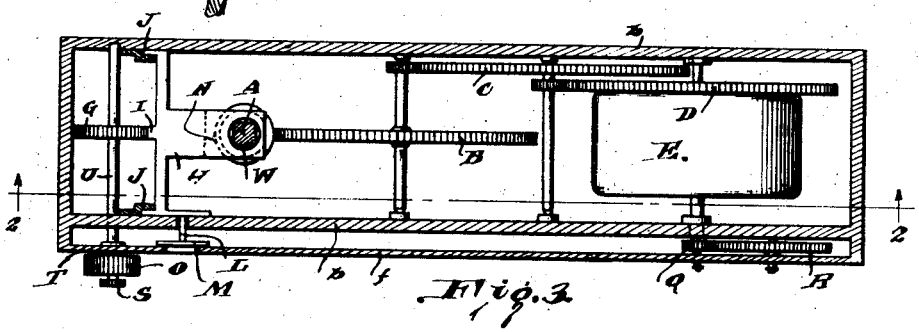

The mechanism by which this is accomplished is shown in Figures 2 and 3.

This consists of a clock, E, which is suspended on its axis provided with ball bearings so that it can revolve freely. A train of wheel and pinion gears connects this clock with one of the worm gears on the axis A which is directly connected to the odometer cable or operated by the engine shaft or wheel of the vehicle. The train of gears are so proportioned that when the vehicle is moving at the set speed, the clock, as a whole, will be revolved to the left with the same velocity with which it is moving its dial hand to the right. As the face of the dial is stationary, the result of these two counter motions, when equal is to hold the dial hand at zero. If the speed exceeds the speed for which the instrument is designed or adjusted, the large dial hand moves to the left; if the speed falls or a stop is made, the large dial hand begins to move to the right because the motion of the clock, as a whole, is slower than the motion of its dial hand with relation to the clock.

The ball bearing axis of the clock is made hollow so that the stem of the dial hand may pass out to the face of the dial. Between the face plate f, of the instrument, and the frame b, this dial stem carries a pinion Q, which operates a gear R which is pivoted between the frame b and the face plate f. This gear operates the small dial hand, and is so proportioned to the pinion that six revolutions of the large dial stem makes one of the small dial. The clock itself, is geared to move the large dial hand through one revolution in 6 minutes. These proportions can, of course, be varied according to the purpose for which the instrument is made.

In Figure 2 are shown three worm gears, having different pitches of the threading. The one engaged to the gear B is made with the proper pitch to move the clock to the left on its axis one revolution in six minutes when the speed is 20 miles an hour.

Below is shown a worm gear of twice the pitch. This will operate the gear B twice as fast, therefore to revolve the clock once in six minutes the speed must be reduced to one half of 20 miles, or 10 miles per hour. The gear above is made with a pitch such that a speed of 25 miles an hour is necessary to complete a revolution of the clock in 6 minutes. The speeds designated are only for the purpose of illustrating the principle of the device, as it will be apparent that worm gears having a different pitch to the threads illustrated may be employed.

These worm gears are formed upon a single block F', the block having a square hole through its axis to receive the square shaft A. The block F' is supported between a pair of arms N formed integrally with the carriage H. Each of the arms N are apertured to receive a bushing W, these bushings having a square opening to receive the shaft A therethrough. The bushings W, are, of course revolubly mounted within the arms N so that rotation of the blocks F' and associated worms will be permitted.

The carriage H is slidably arranged between opposed guide rails J secured upon the interior of the frame B and includes a rack bar I. A shaft U journalled in the frame b includes a gear G which is in mesh with the rack bar I, and this shaft also includes a knurled thumb nut O, whereby rotation of the shaft U may be effected to move the carriage H upwardly or downwardly so as to bring a desired worm gear into registration with the gear wheel B.

The pitch of the worm gears and the velocities thereof are, of course, for the purposes of illustration only, and may be varied to suit the purpose for which the instrument is made. Moreover, I wish it understood that the different pitched gears may be made discontinuous, as shown, or they may be connected by transition threads, or the whole may be made a continuous spiral, the special arrangement of the threading adopted in any case may vary with the special application to which the device is to be put, the principle remaining the same, namely, the variation of the pitch of the worm gear for adjusting the worm instrument to different schedules or speeds.

Thus if a schedule of ten miles per hour is to be maintained throughout a given route, the lowermost worm (as seen in Fig. 2) must be meshed with the gear wheel B. The shaft U is rotated manually by the thumb nut O in a direction to cause the gear G to raise the carriage H by reason of the intermeshed relation between the gear G and the rack bar I. If a speed of twenty or twenty-five miles per hour is to be maintained, the proper worm gear is brought into registry with the gear B, upon movement of the carriage H, as will be readily understood.

When the carriage has been moved so as to place the proper gear in contact with B, it is locked in place by small pins or lugs projecting from the under face of the thumb nut O into holes or recesses in the face plate f. The portion of the shaft U passing through the thumb nut O, is squared and the thumb nut O is made to slide through a short distance in or out. To operate, it is withdrawn slightly to disengage the pins or lugs, and when the carriage has been properly placed as indicated by the figure in the slot P Figure 1, the thumb nut O is pressed inwards engaging the pins or lugs, and the nut is then itself locked in place by the top nut s, which screws into the end of the shaft U and tightens upon the thumb nut O.

The figures seen through the slot P are carried on a plate M, (just back of the face plate f,) which is connected by a rib L passing through a slot in the frame b and rigidly attached to a projection K of the carriage H.

In this specification, a cable odometer mechanism is assumed, as this form is now generally used. But I wish it known that my mechanism may be used with an odometer mechanism consisting of a train of gears, or sprocket wheel and sprocket, or electromagnetic and wire connection to the driving shaft or wheel.

Having described my invention in detail, I claim:—

1. In a schedule indicator for indicating the running schedules of movable vehicles and the like, chronometer means for indicating the departure from the running schedule, drive means actuated by a movable portion of the running mechanism of the vehicle for actuating said chronometer means for indicating departure from the running schedule and means for adjusting said drive means for indicating a desired schedule, comprising a worm wheel for actuating the chronometer means and worms of variable pitch adapted for individual actuation of said worm wheel, as desired.

2. In a schedule indicator for indicating the running schedules of movable vehicles and the like, a dial, a pointer cooperating with said dial for indicating the departure from the running schedule, a rotatable clock-work for actuating said pointer, a gear connected to said clock-work, a gear train connected to said gear, a shaft, a gear carriage slidably mounted thereon and having individual gears of different pitch for selective engagement with a gear of said gear train, means for moving said shaft in synchronism with the movements of said vehicle, a rack carried by said carriage, a gear engaging said rack, and means for turning said gear to bring the desired one of said individual gears into engagement with the gear of said gear train for adjustment of the schedule to be indicated.

CORNELE BERRIEN ADAMS.